3,472,794
AMMONIA SYNTHESIS CATALYST
James L. Carter, Chatham, and Charles G. Savini, Elizabeth, N.J., assignors to Esso Research and Engineering Company, a corporation of Delaware
No Drawing. Filed Nov. 3, 1966, Ser. No. 591,703
Int. Cl. B01j 11/22, 11/24; G01c 1/04
U.S. Cl. 252—459     8 Claims

ABSTRACT OF THE DISCLOSURE

A new and improved ammonia synthesis catalyst which contains from 5 to about 25 wt. percent iron in the reduced state deposited on an activated support of alumina or silicate containing a minor amount of an alkaline promoter metal. This new catalyst has the advantage of exhibiting many desirable characteristics including maintaining high temperature activity, resisting deactivation by temporary overheating, and low variation of activity with change in catalyst particle size.

---

This invention relates to a new kind of ammonia synthesis catalyst of iron on an alumina or silicate support into which is diffused an alkaline metal promoter when the support is activated. This new kind of catalyst, properly prepared, has a number of desirable characteristics: including high-temperature activity maintenance, resistance to deactivation by temporary overheating, low variation of activity with change in calatyst particle size, resistance to poisoning by substances commonly encountered, ease of handling, and ease of activation.

In the supported iron catalysts as in the conventional promoted catalyst for ammonia synthesis, free iron surface is the active catalytic surface. In the promoted catalyst, the other elements or oxides are incorporated in small amounts to promote activity. The use of an acidic or amphoteric oxide, e.g., $Al_2O_3$ or silicates with one or more alkaline metal oxides, e.g., $K_2O$, $Rb_2O$, CaO, BeO, MgO, gives increased activity. There is a similar promoting action by these substances in the supported iron catalyst, but the acidic or amphoteric substance, e.g., alumina or silicate, is the major phase into which a minor proportion of the alkaline metal is diffused and the iron is distributed on the support. In both types, the active free iron is generally pyrophoric, the catalyst is passivated by contact with air, which forms an oxide film on the iron, and the catalyst is reactivated by reducing the oxide film using hydrogen as a reducing gas. The supported iron catalyst has lower iron content, preferably less than 25 wt. percent.

The alumina or silicate used as catalytic supports are considered to be hydrous oxides and to undergo changes in structure as they are heated so as to lose portions of water before they become anhydrous. Thus, hydrous alumina is regarded as activated for present purposes if it is thermally transformed at temperatures in the range of 1100° F. (600° C.) to 1650° F. (900° C.) so that the alumina becomes identified with the forms of alumina described as eta and gamma, delta and theta. This nomenclature is explained in the Kirk-Othmer Encylclopedia of Chemical Technology, 2nd edition, volume 2, pages 48 and 49, with the indication that on heating the eta and gamma forms in the range of 1100° F. to 1650° F. they are progressively changed to the more crystalline hydrous delta and theta forms. In this thermal activation with the alkaline metal present, the alkaline metal atoms diffuse into the alumina or silicate phases. The hydrous silicates are activated by a similar heat treatment. Heating substantially to above 1650° F. is avoided to prevent forming a low surface area support on which the iron easily sinters.

The composition of the ammonia synthesis catalyst having iron supported on the activated support (alumina or silicate containing diffused alkaline metal promoter) is denoted as follows:

$$x \text{ wt. percent Fe/Me, } Al_2O_3$$

wherein $x$ wt. percent Fe is deposited on the activated support cotnaining the diffused promoting metal Me, which may be considered to be present as an oxide in the aluminum oxide lattice. The promoting metals are selected from the group: Cs, K, Rb, Be, Mg, Ca, Ba, Ge, and Zr and mixtures thereof.

The presently described catalysts of iron on an activated support containing the alkaline metal promoter are useful in synthesizing ammonia from gas containing $H_2$ and $N_2$ in proportions of $3H_2:1N_2$ under conventional reaction conditions of temperatures (750° F. to 1000° F.), pressures (60 to 450 atm.) and designs such as shown in the Kirk-Othmer Encyclopedia of Chemical Technology, 2nd edition, volume 2. They are useful in such processes with particular benefits from their distinctive characteristics of more uniform activity even with changes in particle size or temperature. Thus, they are particularly useful in the initial bed of a reactor where the temperature increase may be high. They are useful as a catalyst or diluent for lessening reaction variations. They are useful as a supporting layer for catalyst of smaller particle size.

The conventional commercial catalysts are typified by compositions which contain iron as the major component in combination with alumina and potassium as promoters and in some instances additional metal oxides, such as calcium oxide. It is difficult to describe specifically all the many commercial catalysts, but generally they have been described to cotnain Fe as the major component, i.e., above 50 wt. percent up to about 90 wt. percent of Fe. The preparation of the conventional catalyst has been described as comprising steps of fusing iron oxide and dissolving the promoters in the molten material, crushing the resulting material when solidified and reducing the iron oxide in said material to iron by contact with hydrogen or a nitrogen-hydrogen gas mixture to obtain, in the material, porous iron containing the promoter material. These catalysts are difficult to handle because they tend to be pyrophoric. Some are too fragile; some of them are ruined very easily by contact with poisonous substances, such as phosphorus, arsenic, and sulfur-containing compounds. Their activity tends to be reduced greatly by carbon monoxide and water. The catalyst of high iron-content losses activity rapidly and becomes degraded if heated to temperatures above 950° F., therefore the synthesis reaction generally has been carried out with such catalysts at temperatures between about 800° F. and 950° F. with the need of equipment and care to avoid variations from these temperatures.

One of the best presently known commercial catalysts in unreduced state contains 65 to 70% Fe with 3 to 5% of promoter metals, e.g., Al, K, and/or Ca, these promoter metals being considered present as oxides. After reduction, the Fe content is above 80%. Other promoter oxides which may be present are CsO, RbO, BeO, MgO, and ZrO.

The preferred novel catalyst of the present invention is prepared by impregnating high surface-area hydrous alumina or silicate with an alkaline metal, preferably cesium or potassium, heating the alkaline metal impregnated alumina or silicate to a temperature where the thus formed support material tends to sinter and becomes lowered in surface area, e.g., a temperature in the range of 1100° F. to 1650° F., then depositing on the heat-treated support an iron salt which is easily decomposed at moderate temperatures to impregnate the support with iron in minor proportion to the support, i.e., 5 to 25 wt. percent of Fe, preferably 10 to 20 wt. percent Fe, on the reduced basis. The iron impregnated support may be pilled, prereduced and passivated by air, or pellets of the unreduced catalyst may be reduced in the ammonia synthesis reactor by flowing ammonia synthesis gas at synthesis temperatures of 800° F. to 1050° F.

The controlled high-temperature impregnation of the adsorptive support materials effects diffusion of the alkaline metal promoter into the pores and lattices of the support materials as they are activated. This diffusion becomes more rapid as the temperature is increased to temperatures above 1100° F. and takes place within a reasonable period, e.g., 2 to 8 hours, at 1600° F.

In general, suitable support materials are selected from the class of compounds known as adsorptive hydrous oxides which include beta alumina trihydrate, alpha alumina trihydrate, gamma or eta alumina mixtures of such aluminas, alumino-silicates and magnesium silicates, e.g., asbestos. Materials such as silica or mixtures containing silica are not satisfactorily stable at the high temperatures employed.

The alkaline metal compounds, preferably compounds of cesium and potassium used for the impregnation may be hydroxides, nitrates, carbonates or carboxylates which decompose to form the oxide.

If the support materials are impregnated with the alkaline metal compounds dissolved in aqueous solution, after the adsorption of the solution, the impregnated support material is dried at a relatively low temperature, e.g., about 200° F. to 300° F., for several hours before the heating to effect diffusion. The support material containing the diffused alkaline metal is then impregnated with the active catalytic iron-containing component which, on heating to a moderately high temperature in flowing $H_2$ or synthesis gas, becomes converted to the active iron form.

The alkaline metal compound which is diffused into the porous alumina or an equivalent solid porous silicate material, such as asbestos, may be selected from compounds of alkaline metals in Groups I and II of the Periodic Table, but the most effective metals are cesium and potassium. These alkaline metal compounds may be used in varying proportions depending on the alkaline metal employed. The highly effective cesium may be used in proportions as low as 3 to 10 atoms of cesium per 100 molecules of alumina. The potassium is used in a higher proportion up to 30 atoms per 100 molecules of alumina for a similar effect. Mixtures of the alkaline compounds can be used, e.g., 3 atoms of cesium and 5 atoms of potassium per 100 molecules of alumina to obtain results similar to those obtained with 20 atoms of potassium per 100 molecules of alumina.

The preparation of the preferred catalyst is illustrated in the following examples:

Example 1

An outstanding ammonia synthesis catalyst is prepared to contain 10 cesium atoms per 100 molecules of alumina (10 Cs/100 $Al_2O_3$) as the support for iron. Beta alumina trihydrate (prepared by hydrolysis of aluminum alcoholate) is used to adsorb a solution of $Cs_2CO_3$ in a proportion to diffuse 10 atoms of cesium into 100 molecules of $Al_2O_3$. The alumina containing the cesium compound is dried at 250° F. and the dried material is heat treated at 1600° F. for 8 hours to form the activated, alkalized support. The iron compound is deposited on the support by mixing $Fe(NO_3)_3 \cdot 9H_2O$ with the activated support while heating the mixture in an oven to 100° C. The melting point of the iron nitrate is sufficiently below 100° C. so that it becomes uniformly dispersed over the support granules. The granules containing the deposited iron compound are then pilled and ready for introduction into a reactor wherein flowing ammonia synthesis gases containing 3 moles of $H_2$ per mole of $N_2$ pass over the pills at a temperature of 800° F. to 1100° F. with a preferable range of 800° F. to 1050° F. to reduce the iron so as to form the active catalyst.

The most effective catalysts were obtained by depositing molten ferric nitrate nonahydrate on the activated support. To obtain higher iron levels by aqueous salt impregnation, multiple impregnations are required, each time drying and reimpregnating. For example, iron can be dispersed on the support by two successive impregnations of 7.5% Fe and to obtain a higher iron-containing catalyst, additional impregnations can be used.

In one series of tests, low-temperature and low-pressure conditions were employed, i.e., 60 atms., 805° F. to 870° F., and a space velocity of 15,000 v./hr./v. Using these conditions, tests were performed to determine preferred heat treatment of the support and preferred amounts of iron impregnation on the support. Data summarized in the following Table I indicates relative catalytic activity and correlated physical surface area for a series of the catalysts:

TABLE I.—EFFECTS OF ALKALI AND HEAT TREATMENT ON SURFACE AREA AND CATALYTIC ACTIVITY

| Catalyst Composition | Percent $NH_3$* | Support pretreatment | (m.2/g.) Support surface area |
|---|---|---|---|
| 15% Fe/$Al_2O_3$ | 1.5 | $Al_2O_3$ heated 8 hours at 1600° F. | 90 |
| 15% Fe/Cs, $Al_2O_3$ | 3.2 | 10 Cs/100 $Al_2O_3$ heated 8 hours at 1,100° F. | 300 |
| 15% Fe/Cs, $Al_2O_3$ | 5.4 | 10 Cs/100 $Al_2O_3$ heated 8 hours at 1,600 °F. | 90 |
| 15% Fe/Cs, asbestos | 5.1 | 10 Cs/100 asbestos heated 8 hours at 1,600° F. | 20 |

* $NH_3$ synthesis conditions: 870° F., 60 atms., 15,000 v./hr./v.

The representative data of Table I indicates that the thermal treatment at the elevated temperatures above 1100° F. to 1600° F. markedly improves catalytic activity and decreases the surface area of the support.

As indicated in the following Table II, the preferred amount of iron deposited and dispersed on the support is between 5 and 25 wt. percent when the catalyst is reduced.

TABLE II.—EFFECT OF IRON LEVEL ON AMMONIA PRODUCTION

Catalyst composition: Percent $NH_3$*

5% Fe/Cs, $Al_2O_3$ _____ 3.6
15% Fe/Cs, $Al_2O_3$ _____ 4.3 to 5.4
25% Fe/Cs, $Al_2O_3$ _____ 3.4

* Reaction conditions: 805° F., 60 atms., 15,000 v./hr./v.

The performance of the catalyst characterized by an activated, alkalized aluminia or asbestos support having a suitable amount of iron dispersed thereon and prepared as described in Example 1 is shown to be maintained at a high level after exposure to high temperatures, while the performance of one of the best commercial catalysts is shown to decrease significantly after exposure to a high temperature. See the following Table III:

TABLE III.—CATALYST SUPPORT AND THERMAL STABILITY

| Catalyst composition | Percent $NH_3$* before treat. | Heat treat. Max. temp. (° F.) | Heat treat. Hours at max. temp. | Percent $NH_3$* after heat treat. |
|---|---|---|---|---|
| 15% Fe/Cs, $Al_2O_3$ | 4.8 | 1,050 | 4 | 5.4 |
| 15% Fe/Cs, asbestos | 4.8 | 1,050 | 4 | 5.1 |
| 15% Fe/Cs, $SiO_2$ | 1.2 | 1,150 | 2 | 0.8 |
| 15% Fe/Cs, alumino-silicate | 4.0 | 1,050 | 2 | 3.1 |
| Commercial $NH_3$ syn. cat. | †10.0 | 950 | 2 | †5.3 |

* Reaction conditions: 879° F., 60 atms., 15,000 v./hr./v.
† Reaction temperature=805° F.

The catalyst having the iron compound dispersed on the alkalized and activated support of the 15% Fe/Cs, $Al_2O_3$ type is quickly reduced (e.g. in less than 6 hours) at atmospheric pressure, passivated by exposure to air, and is reactivated by contact with flowing hydrogen containing gas with little or no loss of activity. These supported catalysts can be reduced far more easily than the typical commercial catalyst and may be reduced and passivated prior to pilling.

Catalysts in which potassium was used for alkalizing the support were found to be nearly as active as catalysts in which cesium was used for alkalizing, but the use of a higher proportion of potassium was found desirable unless the potassium was used together with cesium. Potasium hydroxide was employed or impregnating the alumina. Other potassium compounds decomposable to $K_2O$ may be used.

Example 2

A catalyst was prepared containing 15% Fe on an alkalized alumina. Aqueous potassium hydroxide was added to beta trihydrate alumina to yield 30 K atoms per 100 molecules of alumina (30 K/100 $Al_2O_3$). The support was dried at 250° F. after which it was heated to 1600° F. for 8 hours. Impregnation of the alkalized support with Fe was accomplished by addition of $Fe(NO_3)_3 \cdot 9H_2O$ to the support and mixing at 100° C. This temperature is sufficiently above the melting point of the iron salt to provide uniform dispersion. The catalyst was reduced in synthesis gas containing 3 moles of $H_2$ per mole of $N_2$ at a temperature of 800° F. to 1200° F. with a preferable range of 800° F. to 1050° F., to form the active catalyst.

For reaction conditions of 500° C., 60 atm., SV=15,000 v./hr./v., the product contained 5.5% $NH_3$, approaching the equilibrium value of 6.0%. The synthesis gas for the test reaction was 3 moles of $H_2$ per mole of $N_2$. At higher pressures, greater yields are to be expected. In commercial reactors operated with reaction pressures of 100 to 450 atm., the product contains amounts of $NH_3$ approaching equilibrium values in the range of 10 to 15%.

The catalysts made in accordance with the examples given were able to catalyze the reaction to the extent very close to that of the equilibrium requirements for the pressure used particularly as the temperature of reaction was increased in the range from 850° F. to 1020° F. The best commercial catalyst of the promoted high iron-content type showed highest activity at temperature of 800° F. to 850° F. with a sharp decline in activity in terms of percent $NH_3$ in product at above 850° F. to 1000° F. These facts indicate that the catalysts made by dispersing iron on the heat-treated alkalized alumina can be used advantageously when it is desirable to maintain a certain high rate of conversion under varying high temperature reaction conditions such as tend to occur in the initial catalyst bed which is contacted by the synthesis gas. There is an additional advantage obtained from the catalysts of iron dispersed on activated and alkalized alumina or silicate supports in that these catalysts maintain their activity even with changes in particle size, whereas the commercial catalysts of high iron content with promoters in the iron undergo a substantial variation in activity depending on the particle size. These characteristics are shown by data tabulated in the following Table IV:

TABLE IV.—ACTIVITY RELATION TO PARTICLE SIZE
[$NH_3$ synthesis test conditions: 840° F., 60 atms., 22,500 space velocity]

| Catalyst particle size, mm. | Percent $NH_3$ in product | |
|---|---|---|
| | Commercial catalyst | 15% Fe/Cs, $Al_2O_3$ catalyst |
| 0.6–1.6 | 6.8 | 5.4 |
| 3.0–6.0 | 5.0 | 5.4 |
| 6.0–10.0 | 4.0 | 5.4 |

The data on effects of particle size show that the promoted high-Fe catalyst obtained commercially has a variable activity dependent upon particle size and this is attributable to changes in active iron surface area. The catalyst of lower Fe content on the alkalized support does not appear to have a variable activity depending on particle size. Thus, though one catalyst has higher activity with small particle size, there are practical advantages in the use of a catalyst of larger particle size, e.g. 3.0 to 6.0 mm. with less variation of activity.

TABLE V.—THERMAL STABILITY EFFECTS OF TEMPERATURE INCREASE
[10/20 mesh catalyst size base reaction conditions: 805° F., 60 atms.]

| Catalyst | Space velocity | Temp. increased to— | Percent $NH_3$ produced/g. cat. | |
|---|---|---|---|---|
| | | | Before temp. Increase | After temp. Increase |
| Commercial promoted iron. | 15,000 | 950 F. for 7 hrs | 1.6 | 1.0 |
| 15% Fe/Cs, $Al_2O_3$ | 22,500 | 1,050 F. for 10 hrs | 1.3 | 3.4 |
| 5% Fe/Cs, $Al_2O_3$* | 7,000 | 950 F. for 7 hrs | 1.8 | 2.3 |

*Catalysts prepared as described in Example 1.

The data of Table V illustrates how the active iron on the alkalized support has better activity maintenance after exposure to high temperatures. This characteristic adapts such a catalyst for use in an initially contacted catalyst bed.

On a volume basis, the supported iron catalyst (Fe/Cs, $Al_2O_3$) is less active than the promoted high iron-content catalyst, when they are compared in the 0.6 to 1.6 mm. particle size; however, industrial conditions preclude the use of particles below 3 to 6 mm. When the comparison is made on particles of 6 to 10 mm., as would be used in a commercial reactor, the supported iron catalyst is more active than the high iron-content catalyst.

What is claimed is:

1. An ammonia synthesis catalyst comprising 5 to 25 wt. percent iron in a reduced state deposited on an activated support of alumina or silicate impregnated with from 3 to about 30 atoms per hundred molecules of activated support of an alkaline metal promoter.

2. A catalyst as defined in claim 1 in which the activated support is asbestos containing an alkaline metal as the promoter metal diffused therein.

3. A catalyst as defined in claim 1 wherein the activated support is a hydrous alumina heat treated to temperatures in the range of 1100° F. to 1650° F. to give the alumina a transition form of a gamma or eta to theta or delta with a surface area of 20 to 100 m.²/per gram with an alkaline promoter metal selected from the group consisting of Cs, K, Rb, Ca, Mg, Ba, Ge, Be, Zr and mixtures thereof diffused therein, and the iron deposited on the thus activated support is in a compound which is reduced by gaseous hydrogen to make the resulting catalyst carry 5 to 25 wt. percent iron when the catalyst is reduced.

4. A catalyst as defined in claim 1 wherein the promoter metal is of the group consisting of Cs, and K.

5. A catalyst as defined in claim 1 wherein the activated support is alumina of eta to theta form containing 3 to 10 atoms of Cs as the diffused promoter metal per 100 molecules $Al_2O_3$, and the iron is deposited on said support in a proportion of between 5 and 25 wt. percent based on the total catalyst in a reduced state.

6. A catalyst as defined in claim 1 wherein the activated support is eta to theta alumina containing dispersed therein Cs and K as said promoter metal.

7. A process for making an ammonia synthesis catalyst which comprises impregnating a hydrous alumina or silicate with from 3 to about 30 atoms per 100 molecules of said alumina or silica of an alkaline metal promoter selected from the group consisting of potassium and cesium, activating the resulting support by heating to temperatures in the range of 1100° F. to 1650° F. whereby the alkali metal promoter is diffused therein and depositing on the resulting activated and alkali support an iron compound which is decomposable by heating in flowing $H_2$ or synthesis gas to deposit on and impregnate the active support with 5 to 25 wt. percent of iron in a reduced state.

8. An ammonia synthesis catalyst as produced according to claim 7.

References Cited

UNITED STATES PATENTS

| | | | |
|---|---|---|---|
| 2,550,389 | 4/1951 | Sowby et al. | 23—198 |
| 3,243,386 | 3/1966 | Nielsen et al. | 252—466 X |
| 3,253,887 | 5/1966 | Mattox et al. | 23—199 |
| 3,260,679 | 7/1966 | O'Grady et al. | 252—466 X |

DANIEL E. WYMAN, Primary Examiner

C. F. DEES, Assistant Examiner

U.S. Cl. X.R.

23—198; 252—466, 473, 474